(12) United States Patent
Collett et al.

(10) Patent No.: US 11,922,092 B2
(45) Date of Patent: Mar. 5, 2024

(54) SYSTEMS, METHODS, AND APPARATUS FOR UPDATING AN ELECTRONIC SHELF LABEL DISPLAY

(71) Applicant: Walmart Apollo, LLC, Bentonville, AR (US)

(72) Inventors: Michelle Collett, Bella Vista, AR (US); Michael McGuire, Centerton, AR (US); Yiqiang Su, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 218 days.

(21) Appl. No.: 17/079,712

(22) Filed: Oct. 26, 2020

(65) Prior Publication Data

US 2021/0173603 A1  Jun. 10, 2021

Related U.S. Application Data

(60) Provisional application No. 62/926,176, filed on Oct. 25, 2019.

(51) Int. Cl.
*G06F 3/147* (2006.01)
*G06Q 10/087* (2023.01)

(52) U.S. Cl.
CPC .......... *G06F 3/147* (2013.01); *G06Q 10/087* (2013.01)

(58) Field of Classification Search
CPC ... G06F 3/147; G06Q 10/087; G09G 2380/04
See application file for complete search history.

(56) References Cited

U.S. PATENT DOCUMENTS

| | | | |
|---|---|---|---|
| 2009/0099852 A1* | 4/2009 | Ouimet | G06Q 30/0281 705/346 |
| 2014/0052555 A1* | 2/2014 | MacIntosh | G06K 9/00664 705/23 |
| 2015/0178767 A1* | 6/2015 | Wu | G06Q 30/0241 340/5.91 |
| 2020/0234394 A1* | 7/2020 | Calhoon | G06K 9/00664 |
| 2020/0402429 A1* | 12/2020 | Cho | G06Q 10/087 |

* cited by examiner

*Primary Examiner* — Sahlu Okebato
(74) *Attorney, Agent, or Firm* — Fitch, Even, Tabin & Flannery LLP (57) ABSTRACT

An electronic shelf label (ESL) system is discussed. An ESL affixed to a shelf facing assists stock associates in managing products on the shelf. More particularly, the ESL may receive and display step-by-step instructions and/or graphical depictions on a display screen of the ESL that are received from a computing device-executed optimization module. The instructions may be generated to minimize the number of required actions by the stock associate and guide the associate in arranging products on the shelf. The displayed instructions may be determined based on a planogram. The planogram may be generated from a range of criteria including historical profit and loss data, inventory data, supply and demand data and/or labor cost data.

20 Claims, 7 Drawing Sheets

SYSTEMS, METHODS, AND APPARATUS FOR UPDATING AN ELECTRONIC SHELF LABEL DISPLAY

RELATED APPLICATION

This application claims priority to, and the benefit of, U.S. Provisional Patent Application No. 62/926,176, filed Oct. 25, 2019, the entire content of which is incorporated herein by reference in its entirety.

BACKGROUND

Electronic shelf labels (ESLs) can be placed on shelves to display information associated with objects placed on the shelves. The information frequently includes product identifiers and product pricing information.

BRIEF DESCRIPTION OF THE DRAWINGS

To assist those of skill in the art in making and using exemplary embodiments of the present disclosure, reference is made to the accompanying figures. The accompanying figures, which are incorporated in and constitute a part of this specification, illustrate one or more embodiments of the present disclosure and, together with the description, help to explain the present disclosure. Illustrative embodiments are shown by way of example in the accompanying drawings and should not be considered as limiting. In the figures.

DETAILED DESCRIPTION

Described in detail herein are methods and systems for an electronic shelf label system. Embodiments of the present invention use an ESL affixed to a shelf facing to assist stock associates in managing products on the shelf. More particularly, embodiments enable step-by-step instructions and/or graphical depictions displayed on a display screen of the ESL to guide a stock associate in arranging products on the shelf. The products on the shelf may be arranged based on a planogram generated from a range of criteria including historical profit and loss data, inventory data, supply and demand data and/or labor cost data. The planogram is a diagram that shows how and where specific retail products should be placed on the various shelves in the facility order to increase customer purchases. The planogram may be based on an x and y coordinate system to show product locations in the facility and may include a z axis (vertical dimension) to account for multiple shelves in the same location. The instructions for shelf management may be developed so as to minimize the amount of operations performed by the stock associate when transitioning the shelf from a first arrangement to an optimized arrangement and to minimize the time required by the stock associate or other stocking resource, such as a robotic stocker, to perform the arrangement. Real-time feedback may be provided via cameras that acquire images of product placement and movement and adjust graphical depictions and instructions on the ESL accordingly.

In one embodiment, an electronic shelf label (ESL) system includes a display screen affixed to a shelf facing on a first shelf in a facility, the first shelf holding one or more products. The ESL system also includes an input mechanism configured to receive input from a user and a camera disposed in the facility to acquire images of the first shelf. The one or more products on the first shelf are in the field of view of the camera. The camera may be affixed to a second shelf across the aisle or otherwise disposed at another location in the facility from where it can acquire images of the first shelf. The camera may be portable and operated by a user of the ESL system. The ESL system further includes one or more databases storing product position information associated with a current position of the one or more products on the first shelf, and a destination position of the one or more products on the first shelf. The information indicating a destination position may be in the form of a stored planogram. The stored planogram may have been created using a number of different techniques. Additionally, the ESL system includes a computing device communicatively coupled to the display screen, the input mechanism, the camera and the one or more databases. The computing device includes one or more processors and a memory storing computer-executable instructions including an optimization module. When executed, the optimization module generates for display on the display screen instructions for moving a product on the first shelf from the current position to the destination position or generates for display on the display screen a graphical representation of the product in the current position on a graphical representation of the first shelf and visual cues corresponding to the instructions for moving the product from the current position to the destination position, or both. The optimization module also detects that the product is moved from the current position using an image acquired by the camera or input from a user received via the input mechanism and determines that the product is in the correct destination position by comparing the detected destination position to the stored destination position associated with the product that is stored in the database.

In another embodiment, the electronic shelf label system includes a display screen affixed to a shelf facing on a shelf in a facility and a computing device that is communicatively coupled to the display screen. The electronic shelf label system also includes one or more databases storing inventory information regarding one or more products and planogram information indicating where products should be placed in the facility. The one or more databases may also store historical profit or sales data, forecast supply and demand data for the one or more products. The computing device can execute an optimization module, stored in a memory of the computing device, which generates a display of a user mode selection indicator on the display screen enabling a selection from among different user modes that include a customer mode and a layout mode. The computing device receives an input selection of a first user mode from a user via the selection indicator that corresponds to layout mode. The computing device generates a display of a graphical representation of the shelf on the display screen that is based on the planogram information. The graphical representation depicts the shelf holding one or more products. The planogram may be created based on a number of factors including an inventory amount of the product, a forecast of supply and demand of the product, or historical profit or sales of the product or other strategic factors for the facility. The computing device may determine required moves of products from a first position to a second destination position on the shelf, removals of products from the shelf and/or additions of products to the shelf. The execution of the optimization module further generates a display on the ESL display screen of the instructions for moving the products from a first position to a second destination position on the shelf in either a textual or graphical format.

A planogram for a facility will include the number of recommended product "facings" representing the number of products displayed to a customer in the facility at specified locations. It will be appreciated that during retail operations, the current positions of products on shelves in modulars (sections) in a facility represented in a planogram continually change as customers purchase products or otherwise move products while looking for products to purchase thus creating openings on the shelves and changing the number of facings and overall number of products available for purchase by a customer. These openings then need to be filled by associates of the facility (or robotic stockers) performing restocking operations in an attempt to restore the product mix to one that matches the planogram.

In one embodiment a sequence of operations for efficiently moving, adding or removing products on a shelf based on a planogram may be determined by an optimization module based on distance between the current positions of objects and object destination positions on a stored planogram. Optionally during this calculation the current positions within the facility of stocking performers (associates and/or robotic stockers) available for restocking may also be considered. The current position of products may be determined based on stored modular information or camera images of shelves in the facility. The optimization module assesses the area covered by the planogram for differences. Differences may relate to shelf capacity and the distances between products in their current position and their destination location on the stored planogram. Differences may also relate to product absence or excess product being currently displayed. The differences present the opportunity to improve the product faces that were diminished by the detected differences. Based on the detected differences, the optimization module may determine the most efficient actions for restoring the facility to a product display substantially corresponding with the stored planogram. The actions may involve rearranging products within a shelf, moving products from a different shelf to a shelf, moving products from stored inventory to add products a shelf, and/or removing products from a display. A number of different techniques may be used to determine what is the most efficient action based on the detected difference. For example, in one non-limiting embodiment, the movement of product may be dictated solely by the distance between a current product position and a destination position with the product being retrieved from the nearest location that won't require a second action. For instance, if a shelf needs additional product of a certain type that is available both on a nearby shelf and from an inventory location farther away but moving the product from the nearby shelf would require a subsequent action for the nearby shelf, the optimization module may generate instructions for the product to be retrieved from the storage location farther away to limit the number of required actions. As noted above, the optimization module may also consider the number of human and robotic stocking resources available in making the determination as to the sequence of actions.

The optimization module thus performs a loop of assessment—decision—action. It will be appreciated that the optimization module may be needed when a facility receives a new planogram and thus needs to bring its existing product arrangement into conformance with the new planogram. Alternatively, the optimization module may execute on an ongoing basis to ensure that daily changes from customer activities and restocking operations do not change a facility's product mix from that described in the planogram. It should also be appreciated that in some circumstances the actions determined by the optimization module may not result in current product locations that exactly match a planogram due to a lack of product availability, stocking resources and/or additional factors.

In an embodiment, once the sequence of actions is determined by the optimization module, the instructions for performing those operations is transmitted to an ESL attached to a corresponding shelf where the instruction are displayed to the associate. The instructions may include textual steps to be followed by the associate in performing the action and/or may graphically depict the shelf and graphically indicate how products should be rearranged. For example, if the action is to rearrange products on the shelf, the associate may be presented with a graphical depiction of the products in their current position and their intended position. Similarly, if the action is to retrieve an item from another location, the associate performing the restocking may be presented with a textual instruction to go to a certain location and pick up the product and return it to the shelf.

In one embodiment, the determination of the minimum number of steps for moving the product can further be based on store labor costs data associated with stocking the one or more products and the minimum number of steps is based at least in part on labor costs associated with stocking the product.

Figure 1:
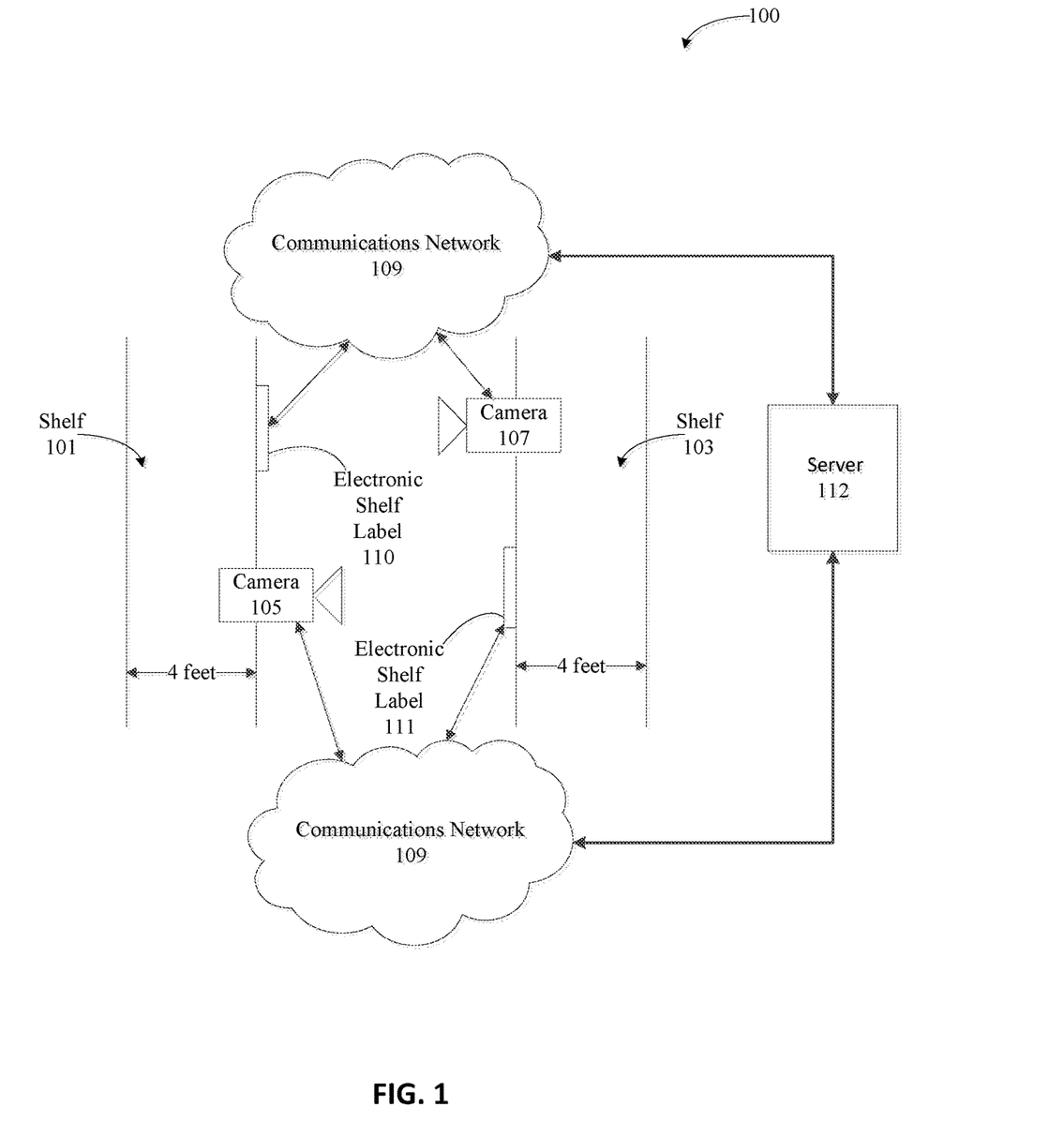
FIG. 1 illustrates an exemplary network environment for an electronic shelf label system, according to an exemplary embodiment.

FIG. 1 is a block diagram of an electronic shelf label system 100 according to an exemplary embodiment. In the exemplary electronic shelf label system 100 in a facility there are two shelves (shelf 101 and shelf 103) that are separated by an aisle that people walk along. The shelves 101 and 103 may each include an ESL 110, 11 with a display screen affixed to a shelf facing. In one embodiment the display screen may be a touchscreen. It will be appreciated that restricting the number of shelves to two in the description of the exemplary electronic shelf label system 100 is done for purposes of illustration and explanation and an actual system will usually have many more shelves than the two shelves depicted. Shelf 101 and shelf 103 can hold multiple products such as grocery products or general merchandise products. An exemplary shelf can be four feet in width and several feet in depth and may be one of several shelves at varying heights on a modular unit. As explained further herein, in response to instructions received via an ESL, a stock associate for the facility may place products on the shelves as additional inventory is needed and/or remove products from the shelves based on a recall of the products or a lessened demand for the products. For example, if the demand for a particular product is not above a certain expected threshold as reflected by sales data in the facility, the instructions may indicate that a particular product should be removed from the shelves relegated to a less valuable spot and/or reduced in the number of facings. Conversely for example if the demand for a particular product increases above a certain expected threshold as reflected by sales data in the facility, instructions may be generated for the stock associate to add more of that particular product to the shelves. The stock associate can also receive instructions via the ESL to reorganize the products on a shelf based on the historical profit or sales data for products, forecasted supply and demand data for the product, and planogram information associated with the products. The planogram may be based on historical sales data and may indicate the number of "facings" a certain product should have on a retail display. A "facing" refers to the front of a product that is at the edge of the shelf facing outward to the aisle so that shoppers can see the product. The planogram information may also indicate the height of a shelf on which the product should be displayed (e.g. kids toys may be located on much lower shelves to catch the attention of shorter children), as well as which products should surround it. In one embodiment, the planogram information can be displayed via the electronic shelf label (electronic shelf labels 110 and 111) that includes a liquid crystal display (LCD) display screen. The planogram may also be printed out as a visual to be followed by the stock associate in restocking shelves and displays or may be forwarded in an electronic format to a mobile device operated by the stock associate for local display.

In one embodiment, an optimized planogram may be generated based on a combination of inventory data, supply and demand data (including expected delivery data), historical profit and sales data and/or labor cost data in order to maximize profit and resource allocation in the facility for an upcoming time period. The ESL system 100 may also determine a series of steps to occur for moving from a current shelf arrangement of products to the arrangement in the optimized planogram that minimizes stock associate time and the number of operations to be performed. As discussed above a series of steps may include moving different products in a particular sequence in the most efficient manner possible. The steps may be provided to a stock associate via an ESL attached at a relevant shelf in order to achieve the optimized planogram.

In some embodiments, ESLs 110 and 111 can operate in different modes of operation including a customer mode and a layout mode. In customer mode ESLs 110 and 111 can display information about the price per item of the product, a price per unit, a special offer for the item and/or compliance information. The ESLs 110, 111 in customer mode may also display an indicator field to display a red light to indicate a discount, In layout mode (accessed by authorized facility personnel such as a stock associate who has selected the mode via a display screen or other mechanism), ESLs 110, 111 may display a number of products in stock and an expected number of products on a shelf. ESLs 110 and 111 are in communication with a server 112 via communications network 10 and can display instructions and/or graphical representations that can assist the stock associate in arranging the product's positioning and facing on the shelve. The layout mode can also include information about the number of units of a product in a storage room in the facility, the number of units of the product available elsewhere that are under control of the facility, information about the products that have been recalled, and which products contain hazardous materials. ESLs 110 and 111 can further display information about how to arrange or rearrange the units of a product on the shelves based on an optimization routine and other information helpful to the associate in performing his or her duties.

Electronics shelf labels 110 and 111 and the shelves 101 and 103 to which they are affixed can be in the field of view of cameras 105 and 107. More particularly, in one embodiment camera 107 is disposed so as to include shelf 101 and electronic shelf label 110 in its field of view while camera 105 is disposed so as to include shelf 103 and electronic shelf label 111 in its field of view. Cameras 105 and 107 can stream live video footage of the field of view of cameras 105 and 107. Cameras 105 and 107 capture the facings of products and the stock associate's interaction with the facings of the products as the stock associate places the products on the shelves and rearranges the products on the shelves. For example, cameras 105 and 107 send a live video stream or static images to server 112 of the footage captured in the field of view of cameras 105 and 107. Cameras 105 and 107 can also receive data from server 112. The data can include instructions that cause cameras 105 and 107 to pan or tilt in a certain direction. The data can include instructions that cause cameras 105 and 107 to zoom in or zoom out, or focus on a specific unit of a product. Cameras 105 and 107 can also be equipped with motion detection and image recognition capabilities that enable the cameras to determine when to begin streaming live video or static images to server 112. Cameras 105 and 107 can communicate with server 112 via communications network 109. For example, the camera can acquire images of a can of green peas and a can of green beans that are used by the server 112 to determine the difference between the two based on a label on the cans.

Communication network 109 can take a number of forms including but not limited to an IEEE 802.11 network, cellular network, or WiMAX network.

Server 112 can include or access one or more databases that include information about one or more products such as inventory information indicating the amount of product in the facility and planogram information indicating product placement information in the facility. In some embodiments, the one or more databases may include historical profit or sales data and forecasts of supply and demand data for the one or more products. In some embodiments, server 112 can generate optimized planogram information based on the inventory information, historical profit or sales data, and forecasts of supply and demand data for the one or more products and/or labor cost data for the stock associated in the facility. In some embodiments, server 112 can generate a stocking routine based on the optimized planogram that is pushed to ESLs 110 and 111. The routine minimizes the number of times the one or more products have to be moved in positions on shelf 101 and 103. The routine may be generated to maximize sales and minimize an amount of time the stock associate has to spend placing and reorganizing the products on the shelves 101 and 103 in order to achieve the optimized planogram.

In one embodiment, the planogram may be optimized using a mix of performance, financial, labor and innovation criteria together with the strategic intent as determined by an operator of the facility. The sequence of steps to be performed by the associate may be determined by a combination of distance between products and the amount of effort required by the associate represented through the required number of touches needed to perform the optimization operations. In one embodiment, pre-determined thresholds related to the number of touches may control whether an associate is instructed via an ESL to perform an action.

Figure 2:
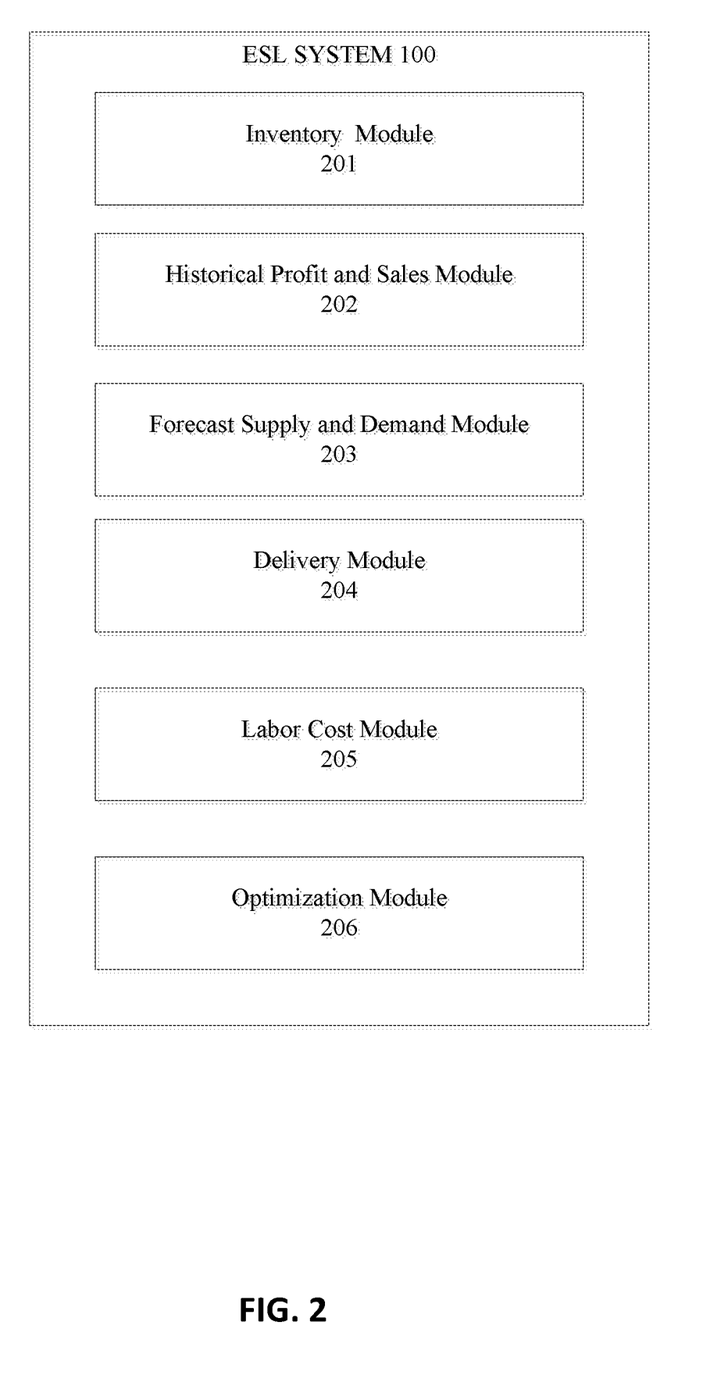
FIG. 2 is a block diagram showing an electronic shelf label system 100 in terms of modules according to an exemplary embodiment.
Figure 5:
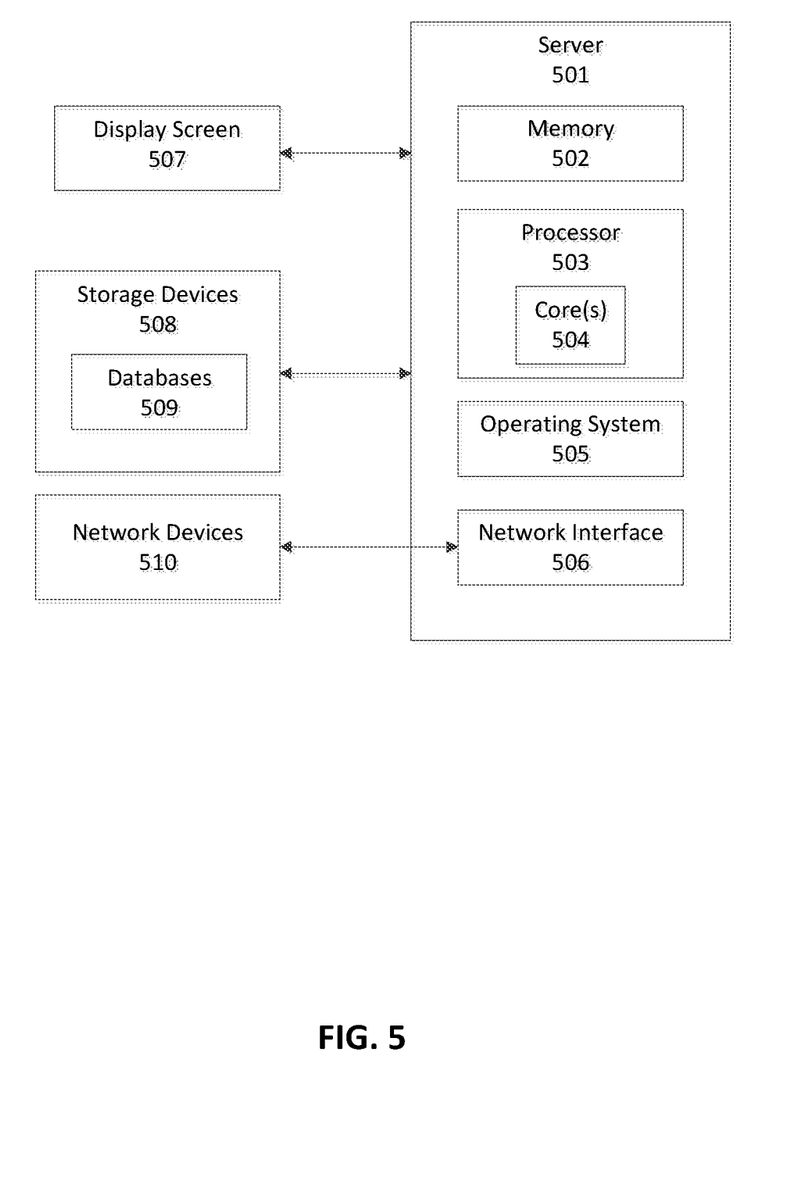
FIG. 5 is a schematic diagram of hardware in an exemplary server that can be utilized in the electronic shelf label system, according to an exemplary embodiment.
Figure 6:
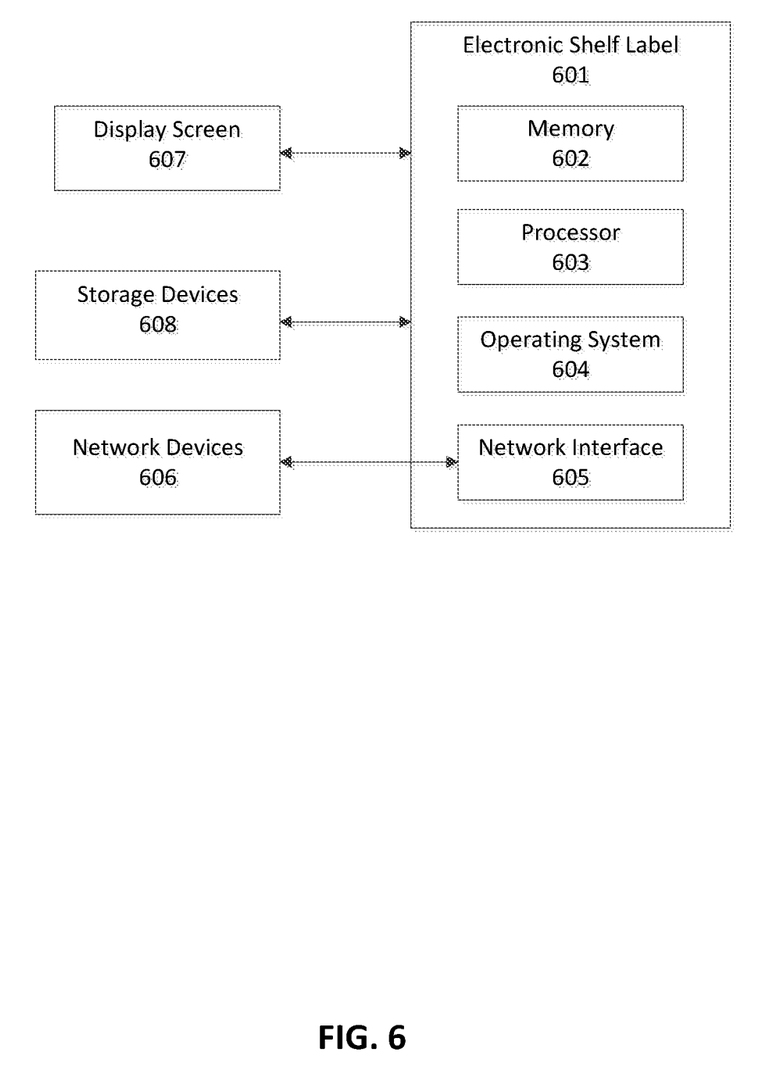
FIG. 6 is a schematic diagram of hardware in an exemplary electronic shelf label that can be utilized in the electronic shelf label system, according to an exemplary embodiment.

FIG. 2 is a block diagram showing an electronic shelf label system 100 in terms of functional modules according to an exemplary embodiment. The modules include computing device-executable instructions. One or more of the modules may be executed using server 501 as shown in FIG. 5 and ESL 601 as shown in FIG. 6. In one embodiment, electronic shelf label system 100 may include an inventory module 201, an historical profit and sales module 202, a forecast supply and demand module 203, a delivery module 204, a labor cost module 205, an optimization module 206.

Inventory module 201 includes instructions to retrieve inventory and planogram information from the databases. The information provides an accounting of the products that are on the shelves including the number of units of the products that are on the shelves, where they are placed on the shelves, and the number of unit facings on the shelves. The accounting can also include the number of units of the products that are not facing, and that are behind the facing units.

An historical profit and sales module 202 includes instructions to retrieve profit and sales data from the databases for each product facing in the facility. The profit and sales data can be historical profit and sales data that is separated into weekly data, monthly data, and yearly data indicating profitability and sales volume for each product. The historical profit and sales data can also include information about the seasonal nature of products. For example, certain products can be expected to sell more during certain times of the year (e.g., pumpkin spice during the fall months).

A forecast supply and demand module 203 includes instructions to retrieve information about the demand for the products from the database. This information can include historical demand for the products in different time periods. The historical demand can include a weekly demand, monthly demand, yearly demand, and/or seasonal demand for the products. The demand information may be cross-referenced against the known supply data retrieved from the databases in order to determine a relative demand value calculated in terms of available supply.

A delivery module 204 may interact with a shipping system for the facility in order to determine which products have pending shipments and when they are scheduled to arrive. The shipment data may also be utilized by the forecast supply and demand module 203 in conjunction with the inventory information provided by the inventory module 201.

The labor cost and demand module 205 may retrieve information about the cost to employ a stock associate for a period of time from the databases. This information can include an hourly wage associated with a stock associate and the cost to have a stock associate work for a period of time. This information can be used by optimization module 206 to determine the minimum number of moves the stock associate will have to perform in order to move a product from one position to another position and the cost to have a particular associate do so.

The optimization module 206 includes instructions to generate an optimized planogram using the data retrieved by inventory module 201, historical profit and sales module 202, forecast supply and demand module 203, delivery module 204 and/or labor cost module 205 so as to maximize profit, resource allocation and/or another objective function in the facility. The retrieved data is used to calculate supply and demand and what the optimal space would be to have the optimal supply for the forecasted demand.

In one embodiment, the optimization module processes and combines the information retrieved by the inventory module 201, historical profit and sales module 202, forecast supply and demand module 203, delivery module 204 and/or labor cost module 205, and feeds the data into a simulator. The simulator simulates sales, profit and labor cost for different numbers of facings. For example, a current facing set-up for a UPC at a store may have 3 facings for UPC 00001, which enables the calculation or the profit, cost and sales for 3 facings based on actual sales data. In order for the optimization module to generate an optimized planogram that includes other facings, the optimization module also needs to know the profit, cost and sales for other facings of UPC 00001, e.g., profit cost and sales for 1 facing, 2 facings, 4 facings and etc. Accordingly, in one embodiment the simulator mimics the store operations with the information from the inventory module 201, historical profit and sales module 202, forecast supply and demand module 203, delivery module 204 and/or labor cost module 205, and uses an event-based monte-Carlo simulation to generate these Key Performance Indicators (KPIs) for different UPCs facing combinations. The optimization module may take the simulation output, combined with UPCs physical dimensions, shelf physical dimensions, and products grouping information together to generate a planogram that is feasible (e.g: one in which all allocated facings physically fit on the shelf and satisfy all MOD requirements) and optimal (e.g.: maximize future profit if the objective is to optimize profit) with a multiple-stage optimization engine which includes sequences of meta-heuristics and mixed integer programming models.

The optimization module may also include instructions to determine the minimum number of times a stock associate will have to move a unit of a product from one position to another position in order to achieve a result indicated in a stored planogram. By minimizing the number of times a stock associate will have to move the unit, the cost associated with employing the stock associate is also minimized because the stock associate will spend less time arranging or rearranging the units of a product. Optimization module 205 can include instructions to minimize an objective function associated with the number of times the stock associate will have to move a unit of a product based on the labor cost associated with arranging the product on the shelf, the profit and sales of the product, stock of the product, inventory of the product, and/or demand for the product. The optimization module 205 can also determine a substitute that is as close as possible to a specified product to be included in the place of the product if the product is out of stock, and send information associated with a substitute product to the ESL notifying the stock associate to put the substitute product in place of the product that is out of stock. The optimization module 206 may also include instructions to verify product placement and operations performed by the stock associate using images acquired by the camera 105,107. In one embodiment, image analysis of the acquired images is performed by server 112. In another embodiment, image analysis of acquired images is performed by camera 105, 107. The camera location may vary in different embodiments. In one embodiment, the camera may be in a fixed location and affixed to a shelf across an aisle from a shelf from which images are being acquired or may be embedded in the ESL rail. In another embodiment, the camera or other imaging device may be affixed to some non-shelf fixture in the facility. In another embodiment, the camera may be a portable camera operated by, or associated with, a facility associate performing stocking operations or a robotic resource tasked with stocking responsibilities.

Figure 3:
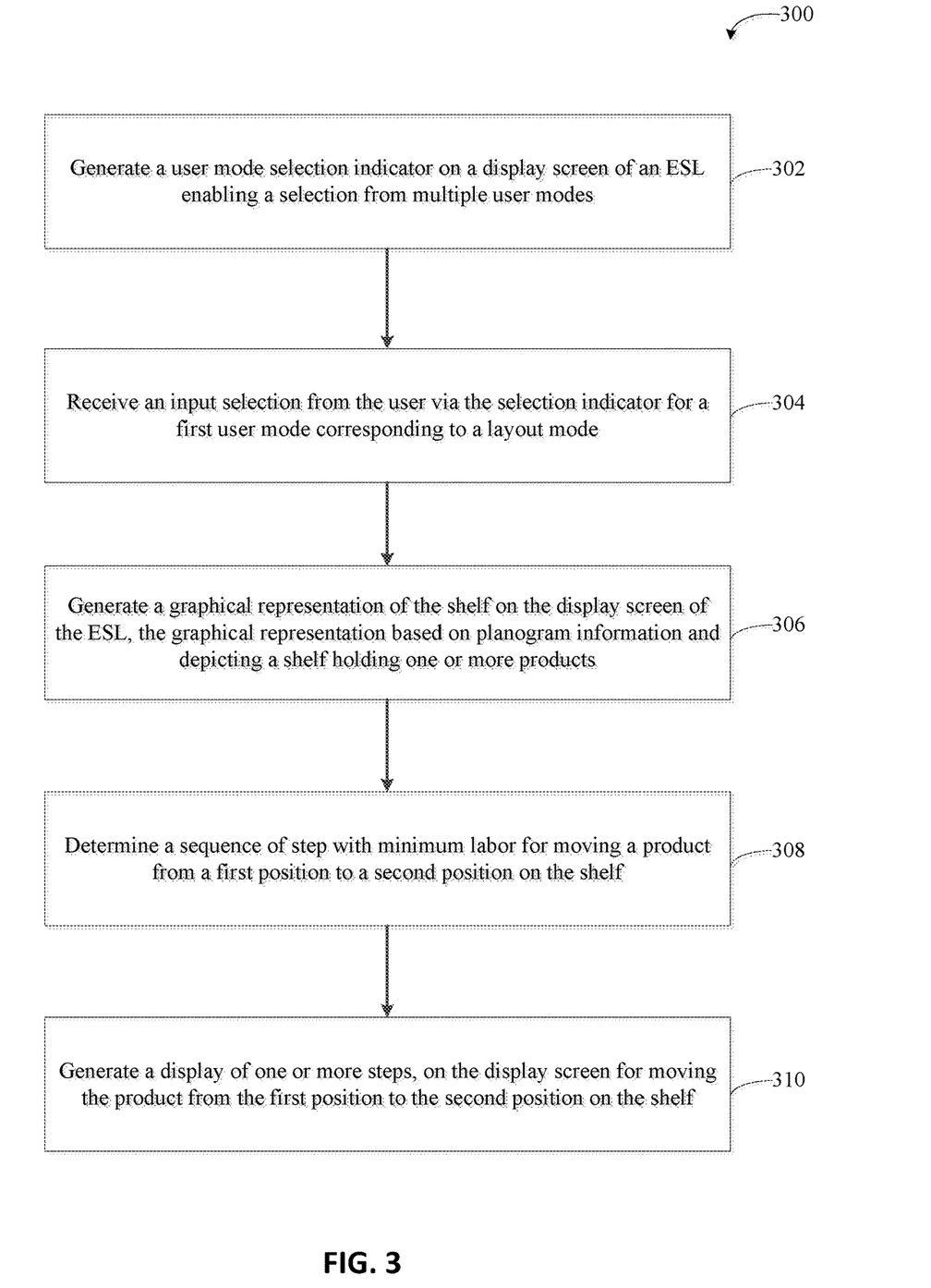
FIG. 3 is a flowchart illustrating an exemplary method for arranging products on a shelf and displaying steps for arranging the products via an electronic shelf label system in an exemplary embodiment.

FIG. 3 is a flowchart illustrating an exemplary method for arranging products on a shelf and displaying steps for arranging the products via an electronic shelf label system in an exemplary embodiment. Exemplary method 300 can generate a display of a user mode selection indicator on a display screen of an ESL (e.g., ESL 111), enabling a selection from different user modes at block 302. At block 304 the method can receive an input selection from the user via the selection indicator on the display screen of the ESL for a first user mode corresponding to a layout mode. The method can then progress to block 306 and generate a graphical representation of the shelf on the display screen of the ESL, where the graphical representation is based at least in part on planogram information generated by the optimization module 206. The graphical representation can depict a shelf holding one or more products that a stock associate can move from one location on shelf to another location on the shelf. At block 308 the method can determine a sequence of steps to be performed with minimum labor. This determination can be made based on results generated from executing optimization module 206. At block 310, the method can generate a display of the one or more steps, on the display screen of the ESL for moving the product from the first position to the second position on the shelf. The generated display make take the form of written instructions, written instructions accompanying a graphical representation or may be in the form of visual cues including animated graphics displayed on the display screen.

Figure 4:
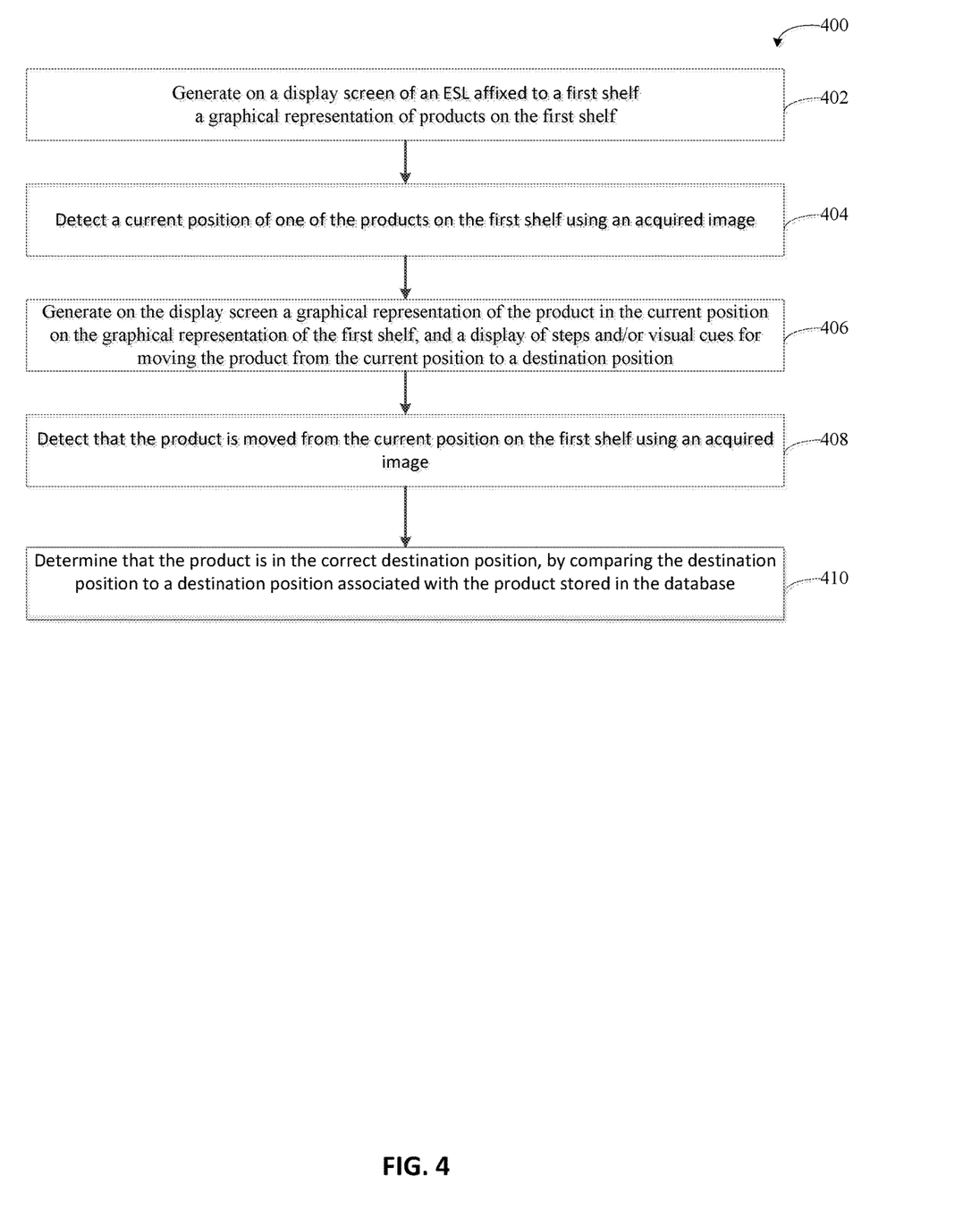
FIG. 4 is a flowchart illustrating an exemplary method confirming the correct arrangement of products on a shelf via an electronic shelf label system in an exemplary embodiment.

FIG. 4 is a flowchart illustrating an exemplary method of an electronic shelf label system for confirming the correct arrangement of products on a shelf. Exemplary method 400 can begin at block 402, and generate on a display screen of an ESL affixed to a first shelf a graphical representation of products on the first shelf. For example, ESL 110, can display the graphical representation of the shelf 103. The method can then progress to block 404, where the method can detect a current position of one of the products on the first shelf using an acquired image from a camera or alternatively or in addition rely on stored positional data from a database. At block 406, the method can generate on the display screen a graphical representation of the product in the current position on the graphical representation of the first shelf, and a display of steps and/or visual cues for moving the product from the current position to a destination position. At block 408, the method can detect that the product is moved from the current position on the first shelf using an acquired image from a camera 105, 107. For example, camera 105 can detect that the position of a product that is in the field of view of camera 105 and that is on shelf 103 near ESL 110. At block 410 the method can determine that the product is in the correct destination position, by comparing the detected destination position to a destination position associated with the product stored in the database (e.g. a position of a product indicated in a stored planogram).

FIG. 5 is a schematic diagram of hardware in an exemplary server 501 that can be utilized in the electronic shelf label system, to perform one or more steps of methods 300 and/or 400 according to an exemplary embodiment. The server 501 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. For example, memory 502 included in the server 501 can store computer-readable and computer-executable instructions or software for implementing exemplary embodiments. The server 501 also includes processor 503 and associated core(s) 504, and optionally, one or more additional processor(s) (not shown), in the case of computer systems having multiple processors/cores, for executing computer-readable and computer-executable instructions or software stored in the memory 502 and other programs for controlling system hardware. Processor 503 and can be a single core processor or multiple core processor.

Memory 502 can include a computer system memory or random access memory, such as DRAM, SRAM, EDO RAM, and the like. Memory 502 can include other types of memory as well, or combinations thereof. An individual can interact with the server 501 through a display screen 507, such as a touch screen display or computer monitor, which can display one or more user interfaces for displaying data to a user (e.g., a display of a storage device in the distributed store connected to the server 501 via network interface 506 and software running on the storage device that is the cause of an error in imported data). The display screen 507 can also display other aspects, elements and/or information or data associated with exemplary embodiments. The server 501 can include other I/O devices for receiving input from an individual, for example, a keyboard or another suitable multi-point touch interface, a pointing device (e.g., a pen, stylus, mouse, or track pad). The keyboard and the pointing device can be coupled to the display screen 507. The server 501 can include other suitable conventional I/O peripherals and can accept voice input and input from robotic and other networked devices.

The server 501 can also include one or more storage devices 508, such as a hard-drive, CD-ROM, or other computer readable media, for storing data and computer-readable instructions and/or software, such as one or more modules of the ESL system 100 shown in FIG. 1 that implements exemplary embodiments of the system as described herein, or portions thereof, which can be executed to generate and display instructions for moving a product from one position to another in an optimal way, such as on display screen 507. Exemplary storage devices 508 can also store one or more databases for storing suitable information required to implement exemplary embodiments. The databases can be updated by an individual or automatically at a suitable time to add, delete or update one or more products in the databases. Exemplary storage devices 508 can store one or more databases 509 for storing provisioned data, and other data/information used to implement exemplary embodiments of the systems and methods described herein.

The server 501 can include a network interface 506 configured to interface via one or more network devices 506 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1004 can include a built-in network adapter, network interface card, PCMCIA network card, card bus network adapter, wireless network adapter, USB network adapter, modem or another device suitable for interfacing the server 501 to a type of network capable of communication and performing the operations described herein. Moreover, the server 501 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The server 501 can run an operating system 505, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 505 can be run in native mode or emulated mode. In an exemplary embodiment, the operating system 505 can be run on one or more cloud machine instances.

FIG. 6 is a schematic diagram of hardware in an exemplary electronic shelf label 601 that can be utilized in the electronic shelf label system, to perform one or more steps of methods 300 and/or 400 according to an exemplary embodiment. The electronic shelf label 601 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flash drives), and the like. For example, memory 602 included in the electronic shelf label 601 can store computer-readable and computer-executable instructions or software for implementing exemplary embodiments. The electronic shelf label 601 also includes processor 603, and optionally, one or more additional processor(s) (not shown), in the case of computer systems having multiple processors/cores, for executing computer-readable and computer-executable instructions or software stored in the memory 602 and other programs for controlling system hardware. Processor 603 and can be a single core processor or multiple core processor. Processor 603 can be embedded into a rail of a shelf that electronic shelf label 601 is affixed to.

Memory 602 can include a computer system memory or random access memory, such as DRAM, SRAM, EDO RAM, and the like. Memory 602 can include other types of memory as well, or combinations thereof. An individual can interact with the electronic shelf label 601 through a display screen 607, such as a touch screen display or computer monitor, which can display one or more user interfaces for displaying data to a user (e.g., a display of a storage device in the distributed store connected to the electronic shelf label 601 via network interface 605 and software running on the storage device that is the cause of an error in imported data). The display screen 607 can also display other aspects, elements and/or information or data associated with exemplary embodiments. The electronic shelf label 601 can include other I/O devices for receiving input from an individual, for example, a keyboard or another suitable multi-point touch interface, a pointing device (e.g., a pen, stylus, mouse, or track pad). The keyboard and the pointing device can be coupled to the display screen 607. The electronic shelf label 601 can include other suitable conventional I/O peripherals.

The electronic shelf label 601 can also include one or more storage devices 608, such as a solid state drive, or other computer readable media, for storing data and computer-readable instructions and/or software, such as one or more modules of the ESL system 100 shown in FIG. 1 that implements exemplary embodiments of the system as described herein, or portions thereof, which can be executed to generate a graphical user interface (GUI) on display screen 607. Exemplary storage devices 608 can also store one or more databases for storing suitable information required to implement exemplary embodiments. The databases can be updated by an individual or automatically at a suitable time to add, delete or update one or more products in the databases.

The electronic shelf label 601 can include a network interface 605 configured to interface via one or more network devices 606 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 605 can include a built-in network adapter, network interface card, PCMCIA network card, card bus network adapter, wireless network adapter, USB network adapter, modem or another device suitable for interfacing the electronic shelf label 601 to a type of network capable of communication and performing the operations described herein. In some embodiments, electronic shelf label 601 can be a computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The electronic shelf label 601 can run an operating system 604, such as versions of the Microsoft® Windows® operating systems, the different releases of the Unix and Linux operating systems, a version of the MacOS® for Macintosh computers, an embedded operating system, a real-time operating system, an open source operating system, a proprietary operating system, an operating systems for mobile computing devices, or another operating system capable of running on the computing device and performing the operations described herein. In exemplary embodiments, the operating system 604 can be run in native mode or emulated mode. In an exemplary embodiment, the operating system 604 can be run on one or more cloud machine instances.

Figure 7:
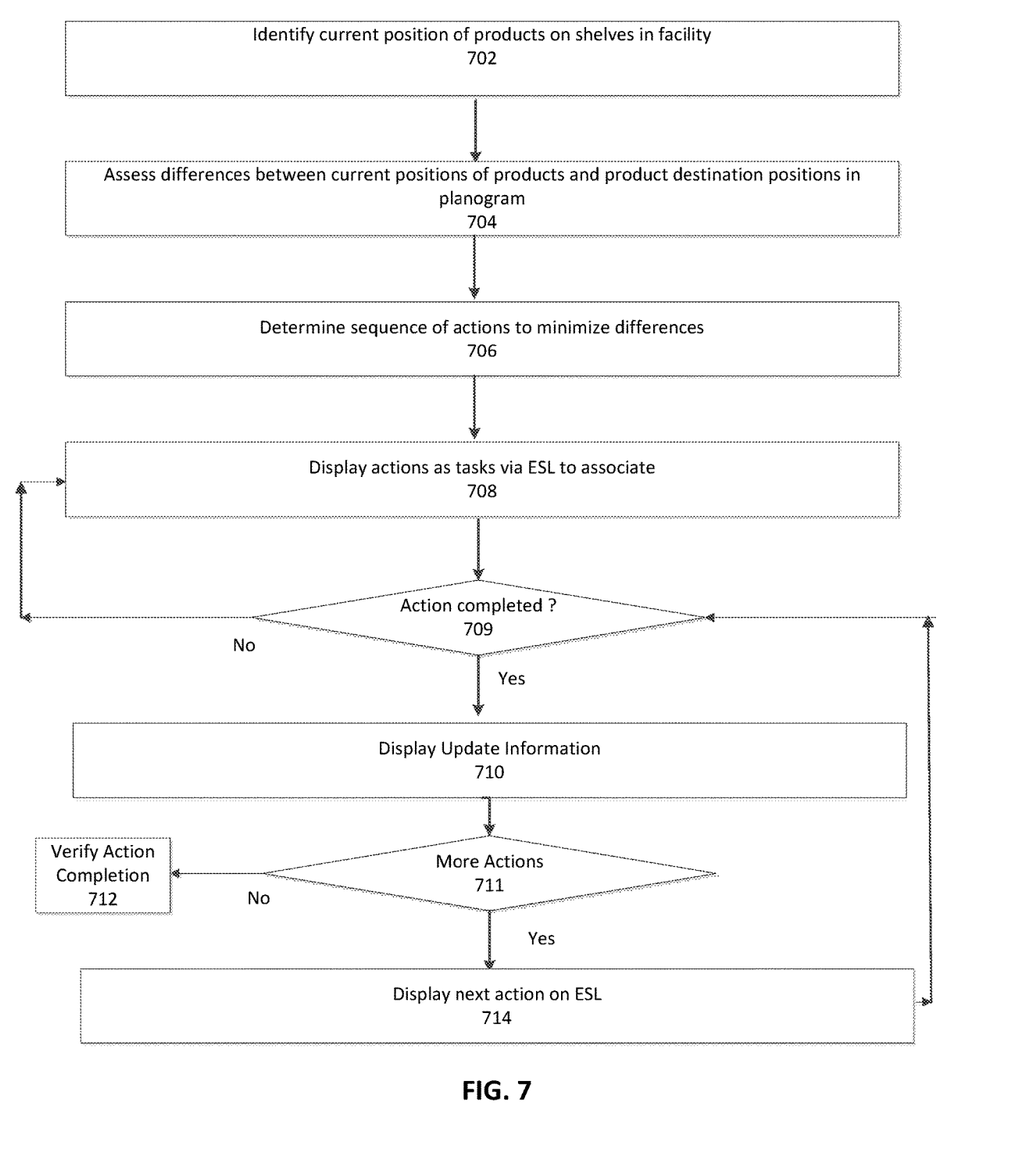
FIG. 7 depicts an assessment-action-decision loop performed by an optimization module in an exemplary embodiment.

FIG. 7 depicts an assessment-action-decision loop performed by an optimization module in an exemplary embodiment. The sequence begins with the optimization module identifying a current position of products on shelves in a facility (step 702). The optimization module then assesses differences between current positions of products and destination positions of those products as indicated in a stored planogram (step 704). The sequence continues with the optimization module determining a sequence of actions designed to minimize differences between the current product positions and those stored in the planogram (step 706). As noted herein, these actions may be determined based on product distance and or associate or robotic stocking resource availability. Once determined, the actions are displayed to an associate via an ESL affixed to a corresponding shelf in the facility (step 708). For example, if the task is to rearrange products on a particular shelf, the ESL affixed to that shelf may display the instructions. If the action is completed (step 709), the optimization module updates the ESL to display information updating the action status (step 710). If there are more actions to be performed (step 711) the optimization module updates the ESL to display the new action (step 714) and the process iterates. If there are no more actions to be performed the action is verified as completed on the ESL (step 712).

In one embodiment, electronic shelf label system 100 may include a paper printout module that generates instructions to print out a paper version of the planogram with instructions for an associate to follow to move one or more products on a shelf from a starting current position to a final destination position, in accordance with the exemplary embodiments disclosed herein. For example, the paper of the planogram may include a graphical representation of the shelf, as well as a minimum number of steps for moving the one or more products from the starting current position to the final destination position. The printout module, may also generate instructions to print out a label for the corresponding one or more products to be affixed to the shelf.

In an embodiment, a handheld device may be utilized that prints out a paper label for one or more products to be affixed to the shelf, and the handheld device may also display the planogram with instructions to move one or more products on a shelf from a starting current position to a final destination position as described herein. For example, the handheld device may display a graphical representation of the shelf, as well as a minimum number of steps for moving the one or more products from the starting current position to the final destination position.

In one embodiment, a handheld device may be utilized to scan an electronic e-ink electronic shelf label. Using the data from the scanned label, the handheld device retrieves and displays a planogram with instructions to move products to a desired location. In some embodiments, the e-ink electronic shelf label may display an icon, and the handheld device may take a snapshot of the icon thereby causing the handheld device to display instructions for moving one or more products on a shelf from a starting current position to a final destination position, in accordance with the exemplary embodiments disclosed herein.

In one embodiment, instead of a handheld device, a worker in a facility may communicate with the rest of the electronic shelf label system 100 via a wearable device equipped with a wireless communication capability. In one embodiment, the wearable device may also include a display surface.

The description is presented to enable a person skilled in the art to create and use a computer system configuration and related method and systems for modifying capacity for a new retail facility. Various modifications to the example embodiments will be readily apparent to those skilled in the art, and the generic principles defined herein can be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes multiple system elements, device components or method steps, those elements, components or steps can be replaced with a single element, component or step. Likewise, a single element, component or step can be replaced with multiple elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts have been provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

Having described certain embodiments, which serve to illustrate various concepts, structures, and techniques sought to be protected herein, it will be apparent to those of ordinary skill in the art that other embodiments incorporating these concepts, structures, and techniques can be used. Elements of different embodiments described hereinabove can be combined to form other embodiments not specifically set forth above and, further, elements described in the context of a single embodiment can be provided separately or in any suitable sub-combination. Accordingly, it is submitted that the scope of protection sought herein should not be limited to the described embodiments but rather should be limited only by the spirit and scope of the following claims.

We claim:

1. An electronic shelf label (ESL) system comprising:
    a display screen affixed to a shelf facing on a first shelf in a facility, the first shelf holding one or more products;
    an input mechanism to receive input from one or more users;
    a camera disposed in the facility to acquire images of the first shelf and the one or more products on the first shelf in the field of view of the camera;
    one or more databases storing current product position information associated with a current position of the one or more products on the first shelf and storing destination product position information associated with a destination position of the one or more products on the first shelf;
    a computing device communicatively coupled to the display screen, the input mechanism, the camera and the one or more databases, the computing device including one or more processors and a memory storing computer-executable instructions including a optimization module, wherein the optimization module when executed:
    identifies current position of the one or more products on the first shelf in the facility;

generates for display on the display screen instructions for moving the one or more products on the first shelf from the current position to the destination position or generates for display on the display screen a graphical representation of at least one of the one or more products in the current position on a graphical representation of the first shelf and visual cues corresponding to the instructions for moving the one or more products from the current position to the destination position, or both;

detects that the one or more products is moved from the current position using an image acquired by the camera or input from a user of the one or more users received via the input mechanism; and determines that the one or more products is in the correct destination position by comparing the detected destination position to the stored destination position associated with the one or more products that is stored in the one or more databases.

2. The ESL system of claim 1, wherein the destination product position information associated with the destination position of the one or more products on the first shelf is stored in the form of a planogram, historical profit and sales data, forecast supply and demand data, delivery data, and/or labor cost data associated with the facility.

3. The ESL system of claim 2, wherein the optimization module when executed:

determines that the one or more products should be removed based at least in part on a demand of the product being below a threshold associated with the sales data.

4. The ESL system of claim 2, wherein the planogram indicates a number of product facings to be displayed on the first shelf.

5. The ESL system of claim 4, wherein the optimization module when executed:

determines that the number of product facings should be reduced based at least in part on a demand for the one or more products being below an expected threshold associated with the sales data.

6. The ESL system of claim 2, wherein the optimization module when executed:

determines a minimum number of positions the one or more products are to be moved between the current position and the destination position.

7. The ESL system of claim 6, wherein the optimization module when executed:

determines the minimum number of positions based at least in part on the delivery data and the labor cost data associated with the facility.

8. A computing device-implemented method for optimizing product placement using an electronic shelf label (ESL), the computing device including one or more processors, the method comprising:

identifying a current position of products on a first shelf in the facility that holds one or more products;

generating for display on a display screen of an electronic shelf (ESL) system affixed to the first shelf, instructions for moving a product on the first shelf from a current position to a destination position, or generating for display on the display screen of the ESL system affixed to the first shelf, a graphical representation of the product in the current position on a graphical representation of the first shelf and visual cues corresponding to the instructions for moving the product from the current position to the destination position, or both;

detecting that the product is moved from the current position using an image acquired by a camera disposed in the facility to acquire images of the first shelf or input from a user received via an input mechanism; and determining that the product is in the correct destination position by comparing the detected destination position to a stored destination position associated with the product, the stored destination position retrieved from a database.

9. The method of claim 8 wherein product position information associated with a destination position of the one or more products on the first shelf is stored in the form of a planogram, historical profit and sales data, forecast supply and demand data, delivery data and/or labor cost data associated with the facility.

10. The method of claim 9, further comprising:

determining that the product should be removed based at least in part on a demand of the product being below a threshold associated with the sales data.

11. The method of claim 9, wherein the planogram indicates a number of product facings to be displayed on the first shelf.

12. The method of claim 11, further comprising:

determining that the number of product facings should be reduced based at least in part on a demand for the produce being below an expected threshold associated with the sales data.

13. The method of claim 9 further comprising:

determining a minimum number of positions the product are to be moved between the current position and the destination position.

14. The method of claim 13, further comprising:

determining the minimum number of positions based at least in part on the delivery data and the labor cost data associated with the facility.

15. A non-transitory medium holding computing device-executable instructions for optimizing product placement using an electronic shelf label (ESL), the instructions when executed causing at least one computing device to:

identify a current position of products on a first shelf in the facility that holds one or more products;

generate for display on a display screen of an electronic shelf (ESL) system affixed to the first shelf, instructions for moving a product on the first shelf from a current position to a destination position, or generating for display on the display screen of the ESL system affixed to the first shelf, a graphical representation of the product in the current position on a graphical representation of the first shelf and visual cues corresponding to the instructions for moving the product from the current position to the destination position, or both;

detect that the product is moved from the current position using an image acquired by a camera disposed in the facility to acquire images of the first shelf or input from a user received via an input mechanism; and determine that the product is in the correct destination position by comparing the detected destination position to a stored destination position associated with the product, the stored destination position retrieved from a database.

16. The medium of claim 15 wherein product position information associated with the destination position of the one or more products on the first shelf is stored in the form of a planogram, historical profit and sales data, forecast supply and demand data, delivery data and/or labor cost data associated with the facility.

17. The medium of claim 16, wherein the planogram indicates a number of product facings to be displayed on the first shelf.

18. The medium of claim 17, wherein the instructions when executed further cause the at least one computing device to:
determine that the number of product facings should be reduced based at least in part on a demand for the produce being below an expected threshold associated with the sales data.

19. The medium of claim 16, wherein the instructions when executed further cause the at least one computing device to:
determine a minimum number of positions the product is to be moved between the current position and the destination position.

20. The ESL system of claim 1, wherein the computing device is configured to transition the display screen from a customer mode, which is configured to display product information, to a layout mode in response to input through the input mechanism and to cause the display screen to display the instructions for moving the one or more products on the first shelf from the current position to the destination position or the graphical representation of the at least one of the one or more products in the current position on a graphical representation of the first shelf and the visual cues corresponding to the instructions for moving the one or more products from the current position to the destination position, or both.

* * * * *